(No Model.)
C. G. PICKETT.
SAW GUARD.
No. 513,138. Patented Jan. 23, 1894.
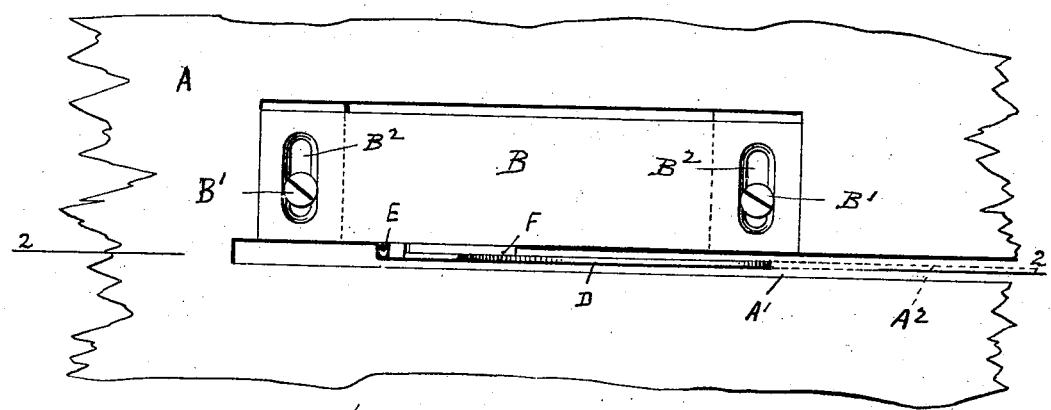
Fig. 1.
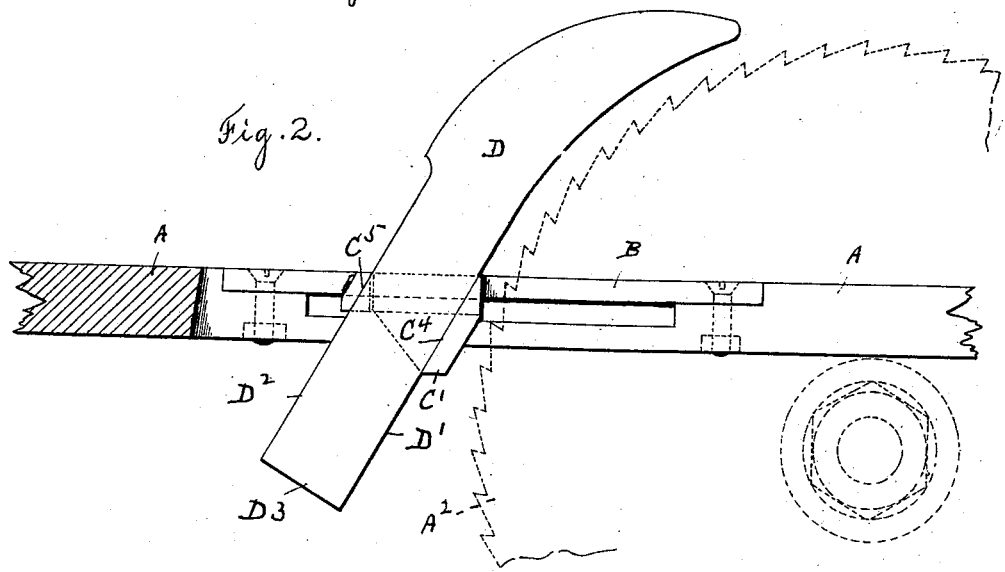
Fig. 2.
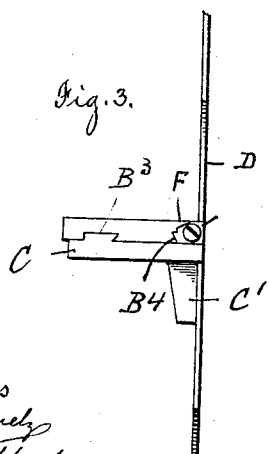
Fig. 3.
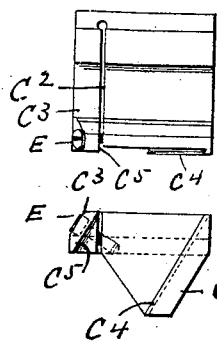
Fig. 5.
Fig. 4.
Witnesses
Inventor
Charles G. Pickett,
By Attorney
Rufus B. Fowler,

UNITED STATES PATENT OFFICE.

CHARLES G. PICKETT, OF BALDWINSVILLE, MASSACHUSETTS, ASSIGNOR TO CHARLES S. DICKINSON, OF SAME PLACE.

SAW-GUARD.

SPECIFICATION forming part of Letters Patent No. 513,138, dated January 23, 1894.

Application filed May 12, 1893. Serial No. 473,905. (No model.)

*To all whom it may concern:*

Be it known that I, CHARLES G. PICKETT, a citizen of the United States, and a resident of Baldwinsville, in the township of Templeton, county of Worcester, and State of Massachusetts, have invented a new and useful Improvement in Saw-Guards, of which the following is a specification, accompanied by drawings, forming a part of the same, and in which—

Figure 1 represents a top view of my improved saw guard and shown as attached to the top of a saw table, or bench. Fig. 2 is a side elevation of the same, with the saw table shown in sectional view on line 2, 2, Fig. 1. Fig. 3 is an end view of the saw guard detached from the saw table. Fig. 4 is a side view of the slide in which the blade is held, shown as detached from the guide plate; and Fig. 5 represents the under side of the slide detached from the guide plate.

Similar letters refer to similar parts in the different figures.

My invention relates to that class of saw guards, which comprises a blade supported at the rear of, and in the plane of a circular saw, for the purpose of preventing the work from being caught by the ascending teeth of the saw.

A denotes a portion of the saw bench, or table, provided with a slit $A'$ for a circular saw, represented by the broken lines $A^2$. I insert a guide plate B in the top of the table with its upper surface flush with the surface of the saw table, to which it is attached by screws $B'$ passing through slots $B^2$ in the guide plate allowing a lateral adjustment of the plate, for the purpose of bringing the blade of the saw guard in the same plane as the circular saw. The under side of the guide plate is provided with a dovetailed groove $B^3$ and also, preferably, with a dovetailed edge $B^4$ to receive a slide C fitting the dovetailed guide plate and capable of sliding thereon. From the edge of the slide C, a lug $C'$ projects downward forming with the edge of the slide C, a vertical bearing surface, against which the blade D is held. The slide C is provided with a transverse slit $C^2$ forming a narrow tongue $C^3$ at the end of the slide. The slide C is provided with an oblique lip $C^4$ and the free end of the tongue $C^3$ is also provided with a parallel lip $C^5$. Between the lips $C^4$ and $C^5$ is held the blade D, the longer lip $C^4$ being slightly cut under and the edge $D'$ of the blade D being beveled to correspond, so as to retain the blade as it is clamped between the two lips, by means of a tightening screw E, which passes through the tongue $C^3$ and enters a screw threaded hole in the slide C. The transverse slit $C^2$ extends nearly across the slide C, so that when the screw E is tightened, thereby drawing the slit together at the free end of the tongue, the dovetailed surfaces of the slide will be slightly thrown out of alignment, causing them to bind upon the guide plate B and hold the slide in a fixed position upon the guide plate; the tightening of the screw E at the same time serves to clamp the blade D between the lips $C^4$ and $C^5$, so that the blade D will be fixed in position in the slide E and the slide will be rigidly attached to the guide plate by the single operation of tightening the screw E. The blade D consists of steel plate lying in the vertical plane of the saw and provided with parallel edges $D'$ and $D^2$, with the lower end $D^3$ extending through the slit $A'$ in the saw table, in order to allow the blade to be raised when saws of larger diameter are used.

In Fig. 2 of the drawings, the blade D is shown as employed with a circular saw represented by the broken lines $A^2$; but if the saw guard is to be used with a saw of greater diameter, it would only be necessary to loosen the screw E, raise the blade D between the lips $C^4$, $C^5$, and move the slide E back upon the guide plate B and clamp both slide and blade at one operation by tightening the screw E. The guide plate B is provided with the projecting lip F extending over the slide E, so as to contract the opening between the saw and the edge of the guide plate.

I am aware that saw guards have been heretofore known, consisting of a guide plate inserted in the top of a saw table and provided with a slide adjustably attached to the guide plate carrying a blade held in the plane of the saw and I do not claim such broadly as my invention, but What I do claim, and desire to secure by Letters Patent, is—

1. The combination of a guide plate, a slide adjustably attached thereto and provided with parallel and oblique lips $C^4$ and $C^5$, a blade D having parallel sides clamped between said lips and means for clamping the blade between said lips, whereby said blade is adjusted to the size of the saw, substantially as described.

2. The combination with a guide plate provided with a dovetailed groove to receive a slide fitting said groove and provided with a transverse slit, a tightening screw by which said slit is closed, and the slide held in position, and a blade held by said slide, substantially as described.

3. The combination of guide plate B, slide C arranged to slide on said guide plate and provided with a transverse slit $C^2$ and the oblique, parallel, lips $C^4$ and $C^5$, blade D, and tightening screw E, substantially as described.

Dated this 4th day of May, 1893.

CHARLES G. PICKETT.

Witnesses:
WM. E. FOWLER,
C. J. WILLIAMS.